United States Patent [19]

Crompton

[11] Patent Number: 4,879,066
[45] Date of Patent: Nov. 7, 1989

[54] FIRE RETARDANT ADDITIVES AND THEIR USES

[76] Inventor: Geoffrey Crompton, 55 Arbour Street, Southport, Merseyside, United Kingdom, PR8 6SQ

[21] Appl. No.: 179,702

[22] Filed: Apr. 11, 1988

[30] Foreign Application Priority Data

| Apr. 11, 1987 | [GB] | United Kingdom | 8708733 |
| Jul. 7, 1987 | [GB] | United Kingdom | 8715929 |
| Sep. 10, 1987 | [GB] | United Kingdom | 8721309 |

[51] Int. Cl.$^4$ .............. C09K 21/00; C09D 5/16; C09D 5/18; C03C 8/14
[52] U.S. Cl. .............. 252/606; 106/18.12; 106/18.15; 106/18.16; 106/18.18; 106/18.21; 106/18.31; 252/601; 252/609; 427/419.4; 427/419.6; 501/16; 501/17; 501/21
[58] Field of Search .............. 252/601, 606, 609, 602, 252/629, 2; 65/18.1, 18.3, 17; 501/14, 15, 16, 17, 21; 106/18.12, 18.15, 18.16, 18.18, 18.21, 18.31

[56] References Cited

U.S. PATENT DOCUMENTS

| Re. 31,428 | 10/1983 | Pedlow | 428/494 |
| Re. 32,131 | 4/1986 | Stahl | 428/494 |
| 4,084,975 | 4/1978 | Faust | 501/16 |
| 4,189,619 | 2/1980 | Pedlow | 428/494 |
| 4,190,698 | 2/1980 | De Boel et al. | 428/334 |
| 4,196,242 | 4/1980 | McLaren | 428/138 |
| 4,273,821 | 6/1981 | Pedlow | 428/494 |

FOREIGN PATENT DOCUMENTS

| 1957622 | 5/1971 | Fed. Rep. of Germany | 501/16 |
| 3306107 | 8/1984 | Fed. Rep. of Germany | 501/16 |
| 1595989 | 7/1970 | France | 501/16 |
| 0356254 | 10/1972 | U.S.S.R. | 501/16 |

Primary Examiner—Howard J. Locker
Attorney, Agent, or Firm—Silverman, Cass, Singer & Winburn, Ltd.

[57] ABSTRACT

A composition comprising two or more frits of different melting temperatures and optionally one or more ceramic material or basalt or intumescent substance is provided that may be added to a variety of materials to provides or enhance fire resistance. Such materials include phenolic and polyester resins and sodium silicate.

17 Claims, No Drawings

FIRE RETARDANT ADDITIVES AND THEIR USES

This invention concerns additive compositions for use in providing or enhancing fire resistance of materials and compositions and a method of providing or enhancing fire resistance properties for materials and compositions.

If alumina trihydrate is used as an additive to plastics materials, as a fire retardant, several difficulties emerge. Alumina trihydrate produces water, up to 30% of its weight, at temperatures of 200 degrees C. This water turns to steam and blankets burning action. It follows therefore, that alumina trihydrate cannot be used in plastics materials which are processed at temperatures above 185 degrees C (to leave a safety margin). Such plastics materials include polypropylene and polyethylene.

Secondly, to be effective, levels of 60% by weight and even 64% by weight of alumina trihydrate have been used in urethane methacrylate and polyesters. Such high amounts of a filling make the resin very difficult to work.

Thirdly, alumina trihydrate is supplied in various grades priced according to their micron size. The cheapest is at 25 micron particle size, the dearest at about 10 micron. The larger particles are in plate form which makes them difficult to disperse in high concentrations, and that can also have an adverse effect on surface finish. The smaller particles are rounded during processing and disperse more easily but are more expensive by a factor of three compared to the larger particles.

Another popular fire retardant additive is antimony oxide. This material contains 3% arsenic and consequently renders any product containing it toxic. Antimony oxide works by combining with free halogen but is only partially effective, in that it improves existing fire retardant properties rather than making materials conform to rigorous tests. Antimony oxide is usually used in amounts of 3% by weight, although higher amounts may be used in some materials.

One object of the present invention is to provide an additive composition that can be used for the purpose of providing or enhancing fire resistance of materials and compositions.

Another object of the present invention is to provide a method of providing or enhancing fire resistance properties for materials and compositions.

According to one aspect of this invention there is provided an additive composition for use in providing or enhancing fire resistance for materials and compositions comprising two or more frits and optionally ceramic and/or basalt fibres or powder.

According to another aspect of this invention there is provided a method of providing or enhancing fire resistance properties for a material or composition comprising adding to said material or composition a composition comprising two or more frits and optionally ceramic and/or basalt fibres or powder.

Preferably a combination of frits of different melting points are used in the compositions of the invention to provide continuous flow of molten frit as temperatures increase. A devitrifying frit is a desirable component of the additive of the invention as that tends to solidify after melting to provide strength. The frits under fire conditions will melt progressively to provide a fused protective layer. A preferred frit combination comprises a low melting frit e.g. that starts to melt at about 450 degrees C. and a high melting or devitrifying frit that starts to melt at about 700 degrees C. The preferred weight ratio of low melt frit to high melt frit is in the range 1:9 to 1:1, especially 3:7. A typical selection of frits may be from those that melt at or about the following temperatures: 450 degrees C., 650 degrees C., 850 degrees C. and 1000 degrees C. The frits used are preferably oven dried, water washed and ground prior to inclusion in the compositions of the invention.

The inclusion of ceramic in fibre or powder form can be used to bind the melting frits and also to remain unchanged at temperatures above 1000 degrees C. Basalt fibre or chopped fibre or powder can also be used in place of or in addition to the ceramic material.

The compositions of the invention may also comprise one or more other fire retardant additives. For example an intumescent substance or substances may be included in the compositions of the invention, such as alumina trihydrate which releases most of its chemically combined water between 200 and 330 degrees C. to dampen burning and reduce smoke emission or hydrated magnesium calcium carbonate which releases its chemically combined water and carbon dioxide from 230 degrees C. upwards. For some purposes hydrated magnesium calcium carbonate may be preferable to alumina trihydrate because it is less expensive to obtain in very finely divided form say of the order to 2 to $3\mu$ particle size. A preferred composition of frits and intumescent substance or substances comprises from 15–50, especially 20–30, % by weight of frits and 85 to 50, especially 80–70, % by weight of intumescent substance(s). Another example of fire retardant additives may be antimony oxide usually used in combination with halogenated hydrocarbon, whereby halogen free radicals are produced that suppress burning.

The proportion of frits to ceramic or basalt in a preferred embodiment of the invention is about 7:3.

The compositions of the invention may be added to a variety of materials such as polymers, paints and sodium silicate. Suitable polymers include polyesters, phenolic resins, polyurethanes and other thermosetting resins and thermoplastics. If, however, alumina trihydrate is to be included in the additive composition, the composition cannot be used on materials processed at 200 degrees C. or more preferably at 185 degrees C. or more.

In a phenolic resin, for example, the proportion of an additive composition of the invention comprising frits and ceramic or basalt to resin may be from 3:7 to 1:4.

The frits additive with intumescent substance, such as hydrated magnesium calcium carbonate or alumina trihydrate or a mixture thereof, may be added to dough moulding compounds, such as of the phenolic or polyester type to be used with glass reinforcement. Preferably the ratio of frits to intumescent is about 1:4.

For addition to phenolic resin frit/intumescent substance mix ratio in the range of from 7:3 to 5:5 may be used. the preferred ratio of that mix to phenolic resin being in the range of 3:7 to 4:6.

The action of heat on a resin which contains an additive composition according to the invention has the following effect. The resin or plastic materials burns and the frit in the first temperature band melts and combines with the char. The second frits then melts and so on. The substrate and burning material are encapsulated by the molten frits thus starving the fire of oxygen. The ceramic or basalt or both, if present, insulate and stiffen the molten mass to prevent excessive running. They also contribute greatly to stability at high temperatures.

Since the particle size of the frits and ceramic can be controlled they are suitable for use with alumina trihydrate in its course form. The particles fill the gaps between the alumina trihydrate plates to give a better finish. The plates of alumina trihydrate act as a suspension agent for the frits/ceramic mix. The water produced in the form of steam has a beneficial effect on the frits, which are water soluble, aiding in the coating action.

The addition of mixes to sodium silicate has a beneficial effect, in that the frits tend to plasticise the sodium silicate under increasing temperature conditions, this counteracts the embrittlement and powdering of the sodium silicate normally encountered in these conditions. The inclusion of frits in an intumescent seal or paint formula would constitute an improvement.

It is preferred to use a mix of frits and intumescent substance, such as hydrated magnesium calcium carbonate or alumina trihydrate or a mixture thereof, say in the ratio of 3:7 to 1:1, preferably 4:6, with sodium silicate and by varying the ratio of the frit mix to sodium silicate materials suitable for different uses may be obtained. At a ratio about 1:1 the resultant mixture has a paint consistency at a ratio of aboiut 7:13 the mixture has adhesive properties and at a ratio of about 1:4 the mixture is in a gel form.

The frit composition of the invention may be used to make sealant say for around fire doors or windows. The preferred sealant will swell when heated and stop any gaps around doors or windows.

For a sealant paste a frit combination containing intumescent with sodium silicate say in the ratio of 3:7 to 4:6, preferably 7:13 by weight may be used as a base to which is added a char agent, such as mica, ammonium polyphosphate and an inorganic gelling agent. The resultant paste is one which will harden in situ.

By using polyvinylacetate in place of the sodium silicate, a resilient sealant may be produced that will swell and harden when heated.

Another possible use of the aditive composition of the invention is in the production of sheets or boards made by compression of chips of wood with a binder. Thus, the binder may be a composition comprising phenolic resin or sodium silicate solution containing ceramics such as carborundum, and frits, preferably three frits having different melt temperatures.

A further use of the additive composition of the invention may be as an adhesive. The preferred adhesive will be based on sodium silicate solution containing a catalyst of phenolic resin and the composition of the invention. Such an adhesive may be used in circumstances where fire resistance is important.

For example, the adhesive may be used for bonding facing sheets, such as of melamine, to a base material, such as chipboard. Then under fire conditions, the adhesive can provide a protective shield for the base material even when the facing sheet has been burnt off.

Another particular use is as an adhesive for attaching a brake lining to its carrier. Indeed brake linings may be made from the same composition, the ceramic material preferably being slag fibre and shot, such as produced as waste from power stations. The brake linings material may comprise additional strengthening components, such as carbon fibre or thermoplastics material e.g. KEVLAR (trade name).

Another example of using frits is in the construction of a laminate comprising an outer skin formed by heat and pressure where a glass cloth has been impregnated with a liquid settable resin, such as phenolic, containing frits of different melt temperatures together with a binding heat stable, fibre, such as ceramic mullite fibre, and optionally alumina trihydrate. The skins of impregnated cloth are place on either side of a ceramic paper, combination basalt, ceramic and glass fibre paper, glass cloth treated with vermiculite or indeed any heat resistance barrier material. When this laminate is pressed under heat and with any number of interleaved sheets the settable resin migrates into the barrier material to produce a solid sheet.

When flame is applied to the laminate the settable resin burns to protect the substrate, the barrier material providing stability.

The surface of the laminate may be covered with melamine sheet either plain or patterned or real wood veneer when flamne is applied, the frits/ceramic help to form a char and prevent spread of flame. This moulded laminate, flat or three dimensional, can then be adhered to a substrate, such as a door, using sodium silicate containing the same frits, ceramic fibre and optionally alumina trihydrate previously mentioned to make a high heat performance adhesive.

The substrate can be rigidized sheet of ceramic fibre which is in turn adhered with the adhesive described, to a heat resistance sound deadening core made from say basalt fibre or rockwool rigidized or non-rigidized. The construction may be repeated about the centre line.

For thirty minute rating the pressed laminates adhered and/or mechanically fixed to a basalt or rockwool core is sufficient. For sixty minute rating the rigidized ceramic board may be introduced, and for extended times the ceramic board can be increased in thickness and a ceramic non-rigid blanket can be used instead of the rockwool/basalt core. For light weight constructions a phenolic foam core or a foam made from the adhesive mentioned can be used.

A foamed vermiculite clay can be included in the adhesive to produce a lightweight, highly insulating core. Alternatively a core can be made by using woodchip as a filler to the adhesive to make a high heat resistance chipboard core to a door, building panel or partition.

This invention will now be further described by means of the following examples.

EXAMPLE 1

A polyester resin containing 20% by weight of alumina trihydrate and 16% by weight of frits and 4% by weight of ceramic powder was found to have enhanced fire resistance.

EXAMPLE 2

A phenolic resin containing 30% by weight of a mixture of frits (80% by weight) and ceramic powder (20% by weight) passed BS 476 part 8 90 minutes fire resistance test.

EXAMPLE 3

A mix containing antimony oxide 3% by weight, one frit at a low temperature melt band at 10% by weight, one frit at a high temperature melt band (of approximately 1100 degrees C.) at 60% by weight and ceramic at 27% by weight made up a casting or injection material which was suitable for use with a phenolic or sodium silicate binder as well as other materials including thermosets and thermoplastics.

EXAMPLE 4

A mix containing antimony oxide 3% by weight, one frit at a low temperature melt band at 7% by weight, one frit at a high temperature melt band (of approximately 1100 degrees C.) at 45% by weight and alumina trihydrate at 45% by weight made a mix suitable for polyesters and other materials including thermosetting resins whose processing is not done above 185 degrees C.

EXAMPLE 5

A basic powder mix was produced from 40% by weight of a combination of a low melting frit (450 degrees C.) and a high melting (devitrifying) frit (700 degrees C.) in the weight ratio of 3:7 and 60% of hydrated magnesiums calcium carbonate.

An adhesive composition was produced by adding 35% by weight of the powder mix to 65% by weight of sodium silicate.

EXAMPLE 6

A paint-like composition was produced by adding 50% by weight of the powder mix of Example 5 to 50% by weight of sodium silicate.

EXAMPLE 7

A gel-like composition was produced by adding 20% by weight of the basic powder mix of Example 5 to 80% by weight of sodium silicate.

EXAMPLE 8

A powder mix of 70% by weight of low melting frit (450 degrees C.) and devitrifying frit (700 degrees C.) in the ratio of 3:7 and 30% by weight of hydrated magnesium calcium carbonate was prepared and then added to phenolic resin in the weight ratio of 3:7 to produce a mouldable material.

EXAMPLE 9

Dough moulding compounds for use with glass fibre reinforcement were prepared based on phenolic resin and on polyester resin. In both cases a powder mix of 20% by weight frits (low and high melting in a ratio of 3:7) and 80% by weight of hydrated magnesium calcium carbonate were added to the resin.

EXAMPLE 10

A sealant paste was produced from the following ingredients in the amounts stated:

EXAMPLE 11

A resilient sealant was produced in the same way as in Example 10 except that polyvinyl acetate was used instead of sodium silicate.

I claim:

1. A composition for providing or enhancing the fire resistance of a material comprising:
   a first frit having a relatively low melting point; and
   at least one other devitrifying frit having a relatively high melting point compared to the melting point of said first frit, said frits melting progressively under fire conditions to provide a fused protective layer for said material.

2. A composition as claimed in claim 1 further comprising ceramic fibres or powder.

3. A composition as claimed in claim 1 further comprising basalt fibres or powder.

4. A composition as claimed in claim 1, further comprising an intumescent substance.

5. A composition as claimed in claim 4 wherein the intumescent substance is alumina trihydrate, hydrated magnesium calcium carbonate or a mixture thereof.

6. A composition as claimed in claim 1 wherein said first frit and said high melt devitrifying frit are in a weight ratio of 1:9 to 1:1.

7. A composition as claimed in claim 6, wherein the weight ratio of low melt frit to high melt frit is about 3:7.

8. A composition as claimed in claim 1 including an intumescent substance wherein the amount of frits is in the range of 15 to 50% by weight and the amount of intumescent substance is 85 to 50% by weight.

9. A composition as claimed in claim 6 further comprising sodium silicate.

10. A composition as claimed in claim 9, wherein the ratio of total frits and intumescent substance to sodium silicate is in the range of 3:7 to 1:1.

11. A composition as claimed in claim 6 further comprising phenolic resin.

12. A composition as claimed in claim 6 further comprising polyester resin.

13. A composition as claimed in claim 1 further comprising a char agent, ammonium polyphosphate, sodium silicate and an inorganic gelling agent.

14. A composition as claimed in claim 1 further comprising a char agent, ammonium polyphosphate, polyvinylacetate and an inorganic gelling agent.

15. A composition as claimed in claim 1 wherein said first frit has a melting point between 300°–500° C. and said at least one other devitrifying frit has a melting point between 600°–800° C.

16. A method of providing or enhancing the fire resistance of a material or composition comprising adding thereto a composition including a first frit having a relatively low melting point and a second devitrifying frit having a relatively high melting point compared with said first frit so that under fire conditions the frits melt progressively to provide a fused protective layer for said material or composition to be protected.

17. A composition for providing or enhancing the fire resistance of a material comprising:
    a first frit having a relatively low melting point;
    a second frit having a melting point higher than said first frit; and
    at least one other frit having a melting point higher than said second frit, at least one of said frits being a devitrifying frit, said frits melting progressively under fire conditions to provide a fused protective layer for said material.

* * * * *